United States Patent
Pang

(10) Patent No.: US 9,628,315 B2
(45) Date of Patent: Apr. 18, 2017

(54) METHOD FOR MEASURING TIME DELAY OF OFDM CLUSTER SYSTEM

(71) Applicant: CHIPSEA TECHNOLOGIES (SHENZHEN) CORP., Shenzhen Guangdong (CN)

(72) Inventor: Xinjie Pang, Guangdong (CN)

(73) Assignee: CHIPSEA TECHNOLOGIES (SHENZHEN) CORP., Shenzhen, Guangdong (CN)

( * ) Notice: Subject to any disclaimer, the term of this patent is extended or adjusted under 35 U.S.C. 154(b) by 0 days.

(21) Appl. No.: 15/172,098

(22) Filed: Jun. 2, 2016

(65) Prior Publication Data

US 2016/0285666 A1    Sep. 29, 2016

(51) Int. Cl.
*H04B 1/10* (2006.01)
*H04L 27/26* (2006.01)

(52) U.S. Cl.
CPC ........ *H04L 27/2657* (2013.01); *H04L 27/265* (2013.01); *H04L 27/2695* (2013.01)

(58) Field of Classification Search
CPC ........... H04L 25/03038; H04L 27/2647; H04L 2025/03414; H04L 25/03057; H04B 1/1036
USPC ................ 375/259–285, 316–352, 354–376, 375/229–236
See application file for complete search history.

(56) References Cited

U.S. PATENT DOCUMENTS

| | | | | |
|---|---|---|---|---|
| 6,553,066 B1 * | 4/2003 | Pollet | ......... | H04L 27/2662 375/219 |
| 7,088,782 B2 * | 8/2006 | Mody | ......... | H04L 1/0618 375/260 |
| 7,580,467 B2 * | 8/2009 | Sampath | ......... | H04L 25/0232 375/260 |
| 7,983,323 B2 * | 7/2011 | Kent | ......... | H04B 1/7115 375/148 |
| 7,991,091 B2 * | 8/2011 | Suzuki | ......... | H04L 27/2605 370/203 |
| 8,040,987 B2 * | 10/2011 | Oh | ......... | H04L 25/0208 375/285 |
| 8,098,776 B2 * | 1/2012 | Kent | ......... | H04B 7/0697 375/141 |
| 8,170,081 B2 * | 5/2012 | Forenza | ......... | H04B 7/0417 370/278 |

(Continued)

*Primary Examiner* — James M Perez

(57) ABSTRACT

A method for measuring a time delay of an OFDM cluster system includes steps of: transforming a received signal to a frequency-domain; providing channel estimation to a corresponding carrier position based on RS; providing frequency-domain interpolation channel estimation; processing the carriers of the same frequency-domain between different symbols with frequency deviation estimation, so as to obtain an angular velocity; calculating an average angular velocity; after the linear interpolation, transforming RS symbols to a time-domain, so as to obtain a crude time delay; and compensating based on the angular velocity, so as to obtain a fine time delay. For the cluster system adopting the method, the accuracy of the terminal side system time delay detection is improved, in such a manner that the availability of the terminal side automatic time delay adjustment is greatly increased, and the TA adjustment under the group calling service of the cluster system is sufficiently compensated.

6 Claims, 4 Drawing Sheets

(56) References Cited

U.S. PATENT DOCUMENTS

| | | | | |
|---|---|---|---|---|
| 8,175,204 | B2* | 5/2012 | Kawauchi | H04L 25/0216 375/260 |
| 8,238,488 | B1* | 8/2012 | Lee | H04L 25/03203 375/262 |
| 8,406,323 | B2* | 3/2013 | Huang | H04L 27/265 375/260 |
| 8,446,990 | B2* | 5/2013 | Liu | H04L 25/0212 375/259 |
| 8,571,086 | B2* | 10/2013 | Forenza | H04B 7/024 370/278 |
| 8,681,912 | B2* | 3/2014 | Park | H04L 25/0212 375/232 |
| 8,774,310 | B2* | 7/2014 | Khan | H04L 5/0023 375/133 |
| 9,203,674 | B2* | 12/2015 | Kobayashi | H03G 3/3078 |
| 9,306,789 | B2* | 4/2016 | Dhayni | H04L 27/2657 |
| 9,319,166 | B2* | 4/2016 | Khoryaev | H04L 1/0057 |
| 9,369,309 | B2* | 6/2016 | Seyama | H04L 25/0202 |
| 2004/0190657 | A1* | 9/2004 | Seki | H04B 7/01 375/347 |
| 2005/0265489 | A1* | 12/2005 | Chang | H04B 17/336 375/340 |
| 2007/0153922 | A1* | 7/2007 | Dong | H04L 25/0204 375/260 |
| 2008/0074556 | A1* | 3/2008 | Sakai | H04N 5/4401 348/726 |
| 2008/0192876 | A1* | 8/2008 | Dulger | H03L 7/1806 375/376 |
| 2008/0292027 | A1* | 11/2008 | Liu | H04B 1/0003 375/340 |
| 2009/0262847 | A1* | 10/2009 | Jo | H04L 1/20 375/260 |
| 2010/0260248 | A1* | 10/2010 | Hung | H04L 25/0212 375/224 |
| 2010/0309997 | A1* | 12/2010 | Kimura | H04L 1/0029 375/260 |
| 2011/0002371 | A1* | 1/2011 | Forenza | H04B 7/0417 375/227 |
| 2011/0002410 | A1* | 1/2011 | Forenza | H04B 7/0617 375/267 |
| 2011/0002411 | A1* | 1/2011 | Forenza | H04B 7/024 375/267 |
| 2011/0141918 | A1* | 6/2011 | Li | H04J 3/00 370/252 |
| 2011/0164597 | A1* | 7/2011 | Amini | H04L 1/0041 370/338 |
| 2011/0228884 | A1* | 9/2011 | Qiu | H04L 25/022 375/350 |
| 2012/0087430 | A1* | 4/2012 | Forenza | H04B 7/024 375/267 |
| 2013/0034130 | A1* | 2/2013 | Forenza | H04B 7/0417 375/219 |
| 2015/0223245 | A1* | 8/2015 | Cheng | H04W 48/16 370/329 |
| 2016/0087820 | A1* | 3/2016 | Sahin | H04B 7/0456 375/240 |
| 2016/0149731 | A1* | 5/2016 | Henry | H04B 7/0413 375/231 |

* cited by examiner

METHOD FOR MEASURING TIME DELAY OF OFDM CLUSTER SYSTEM

CROSS REFERENCE OF RELATED APPLICATION

The present invention claims priority under 35 U.S.C. 119(a-d) to CN 201510390591.2, filed Jun. 30, 2015.

BACKGROUND OF THE PRESENT INVENTION

Field of Invention

The present invention relates to a technical field of wireless communication, and more particularly to a method for measuring a time delay of a cluster system.

Description of Related Arts

In a wireless communication system, due to changes of terminal positions, a time point when a terminal signal reaches a base station is not able to keep pace with an air interface. As a result, a terminal signal strength which is actually received by a system and a success rate of demodulation are lowered. If a time delay is too large, inter-symbol interference will be caused and thus undermining an orthogonality of a multi-carrier, leading to a sharp decline in performance.

In order to solve a terminal time delay problem, a base station in a public network system measures a time delay of a terminal signal (mainly through SRS/RS) and timely notifies a terminal for providing TA adjustment, so as to ensure the terminal signal and an air interface are synchronized as far as possible when the terminal signal arrives at the base station. In a cluster system, due to limitations of group call service features resource constraints, the cluster system is not able to provide timely TA adjusting orders to group membranes.

For example, Chinese patent application, CN 201010241160.7, discloses a method for measuring a relative time delay in a wideband OFDM system, wherein during measurement of the relative time delay of a transmitting channel, different transmitting channels are distinguished by transmitting different sub-carriers of a frequency-domain sequence, and a frequency-domain of the transmitting channel, which satisfies a corresponding time-domain sequence, is defined as a cycle sequence. Therefore, when the transmitting channel transmits a time-domain sequence, only cycle data thereof is transmitted, so as to occupy a system time as little as possible. The frequency-domain sequence corresponding to an entire time-domain cycle sequence is determined by receiving the cycle data transmitted by different transmitting channels, and phase differences of non-null sub-carriers corresponding to each of the transmitting channels in the frequency-domain sequence are used for calculating the relatively time delay according to a proportional relationship between the relative time delay and phases, thereby improving a relative time delay measurement accuracy. That is to say, different transmitting channels are distinguished by transmitting different sub-carriers of the frequency-domain sequence, and the cycle sequence of the transmitting channel is defined; then the relatively time delay is calculated according to the proportional relationship between the relative time delay and the phases, thereby improving the relative time delay measurement accuracy. However, although the application is able to improve the accuracy to some extent, only self-estimated air interface time delay based on a downlink signal of the base station is considered for a phase time delay compensation, which is not combined with the terminal. Furthermore, achieving processes are complicated, and are only suitable for base station side processing.

SUMMARY OF THE PRESENT INVENTION

For solving the above problems, an object of the present invention is to provide a method for measuring a time delay of an OFDM cluster system, which improves an accuracy of terminal side system time delay detection, in such a manner that an availability of terminal side automatic time delay adjustment is greatly increased, and TA adjustment under a group calling service of a cluster system, which is not timely, is compensated.

Another object of the present invention is to provide a method for measuring a time delay of an OFDM cluster system, which has simple operation and is easy to be judged and maintained.

Accordingly, in order to accomplish the above objects, the present invention provides:

A method for measuring a time delay of an OFDM cluster system, comprising steps of:

201) transforming a received signal to a frequency-domain;

202) providing channel estimation to a corresponding carrier position based on RS, which specifically comprises steps of:

202-1) generating a local basic sequence $RS_L$ of the RS based on UE (terminal) ID;

202-2) extracting received sequence RSr from received frequency-domain data; and 202-3) processing the $RS_L$ and the RSr with conjugate dot product for obtaining the channel estimation H of each of carriers of the frequency-domain, wherein $H=RSr*RS_L^H$;

203) providing frequency-domain interpolation channel estimation, wherein specifically, for a jumping pilot which is comb-shaped or tooth-shaped, calculating the H according to a pilot position, and providing linear interpolation for obtaining the H at all carrier points;

204) processing the carriers of the same frequency-domain between different symbols with frequency deviation estimation, so as to obtain an angular velocity, which specifically comprises steps of:

204-1) detecting whether pilot symbols of identical carriers at different time points (symbols) are identical, wherein if a phase difference exists between the identical carriers, a frequency deviation exists; and 204-2) obtaining the angular velocity according to the phase difference between the identical carriers;

wherein:

if a carrier phase at a time point t0 is $\omega 0$, then a received carrier is $Y0=e^{\hat{}}j*2*PI*\omega 0)$;

if the carrier phase at a time point t1 is $\omega 1$, then the received carrier is $Y1=e^{\hat{}}j*2*PI*\omega 1$;

wherein the phase different between the t0 and the t1 is: $Y1*Y0\ H=e^{\hat{}}j*2*PI*(\omega 1-\omega 0)$, then $\Delta\omega=\omega 1-\omega 0$;

and the angular velocity is $\phi=\Delta\omega/(t1-t0)$;

205) calculating an average angular velocity of the carriers of the frequency-domain;

206) after the linear interpolation, transforming RS symbols to a time-domain, so as to obtain a crude time delay; and 207) compensating based on the angular velocity, so as to obtain a fine time delay, which specifically comprises steps of:

207-1) calculating the frequency deviation, wherein the frequency deviation $\Delta f$ is calculated based on the angular velocity $\phi$, wherein $\Delta f=\phi/2*PI$; and 207-2) processing each of the carriers with frequency compensation in the time-domain, then $y=Y*(e\textasciicircum{-}j*2*PI*\Delta f*\Delta t)$;

wherein the steps 201-203 are repeated for the different symbols which all comprise the RS.

Further, the step 204 is repeated for different frequency-domain carrier symbols.

For the cluster system adopting the method, the accuracy of the terminal side system time delay detection is improved, in such a manner that the availability of the terminal side automatic time delay adjustment is greatly increased, and the TA adjustment under the group calling service of the cluster system, which is not timely, is sufficiently compensated.

The present invention combines frequency and time domain characteristics for time delay estimation. Compared with conventional time delay estimation, the present invention sufficiently improves time delay estimation accuracy. Based on the technology, the availability of the terminal side automatic time delay adjustment is increased. The terminal is able to automatically estimate an air interface time delay based on a downlink signal of the base station, in such a manner that the TA adjustment under the group calling service of the cluster system, which is not timely, is sufficiently compensated.

DETAILED DESCRIPTION OF THE PREFERRED EMBODIMENT

Figure 1:
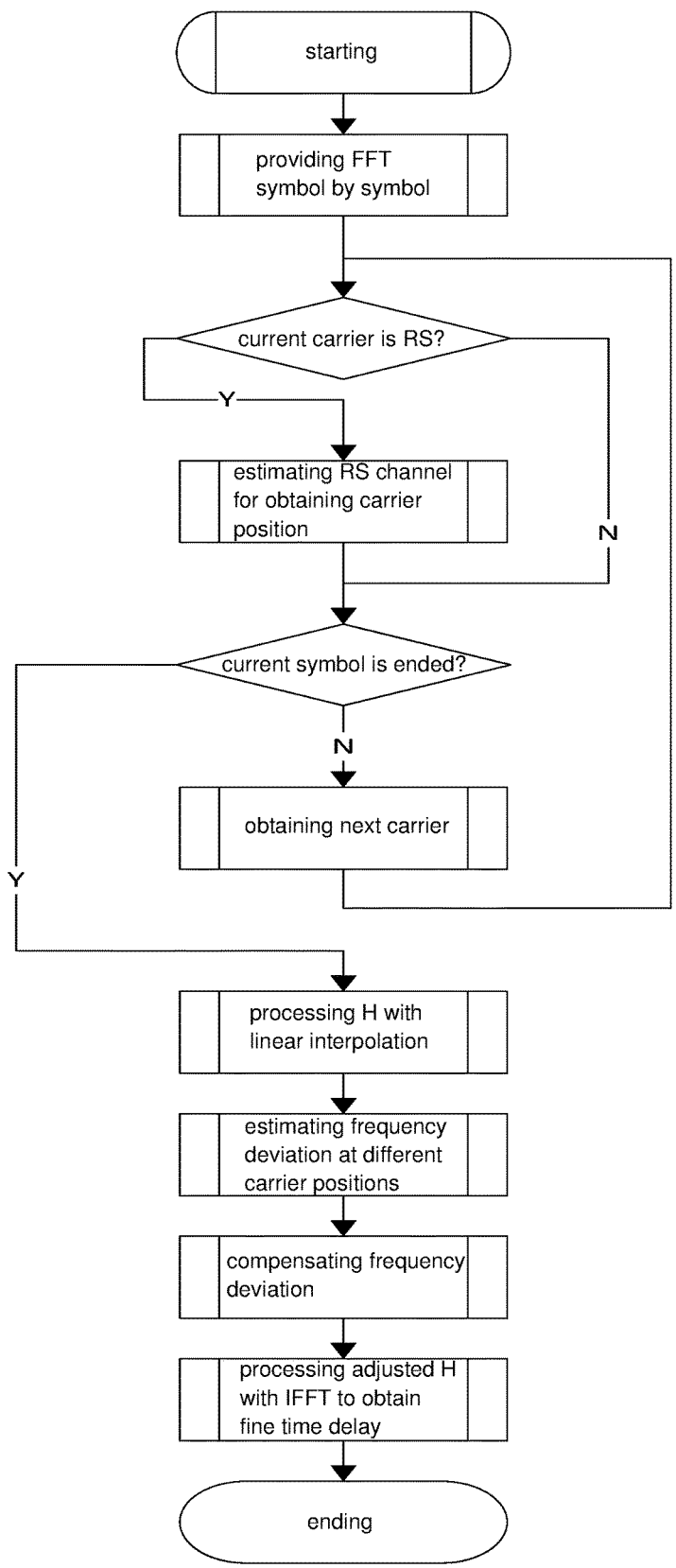
FIG. 1 is a flow chart of the present invention.

Objectives, features, and advantages of the present invention will become apparent from the following detailed description, the accompanying drawings. One skilled in the art will understand that the embodiment of the present invention as shown in the drawings and described below is exemplary only and not intended to be limiting.

Figure 2:
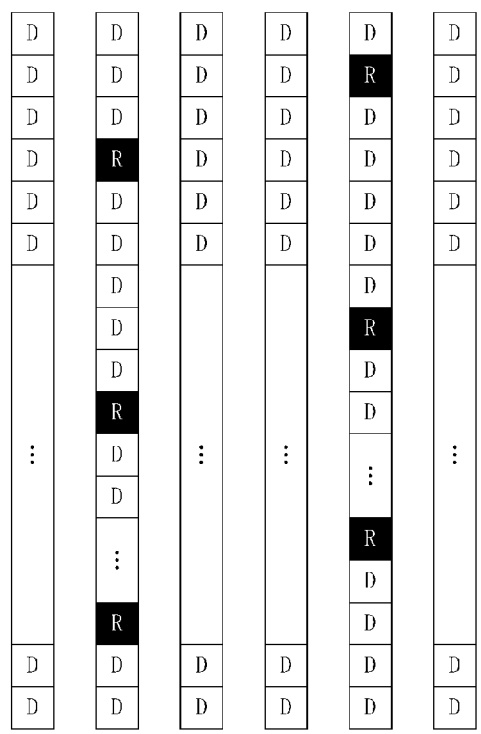
FIG. 2 illustrates a channel of a received signal of the present invention.
Figure 3:
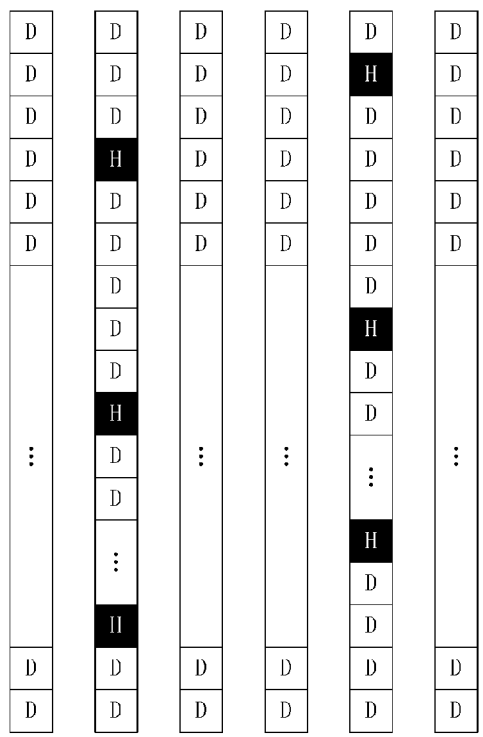
FIG. 3 illustrates a channel of pilot position channel estimation of the present invention.
Figure 4:
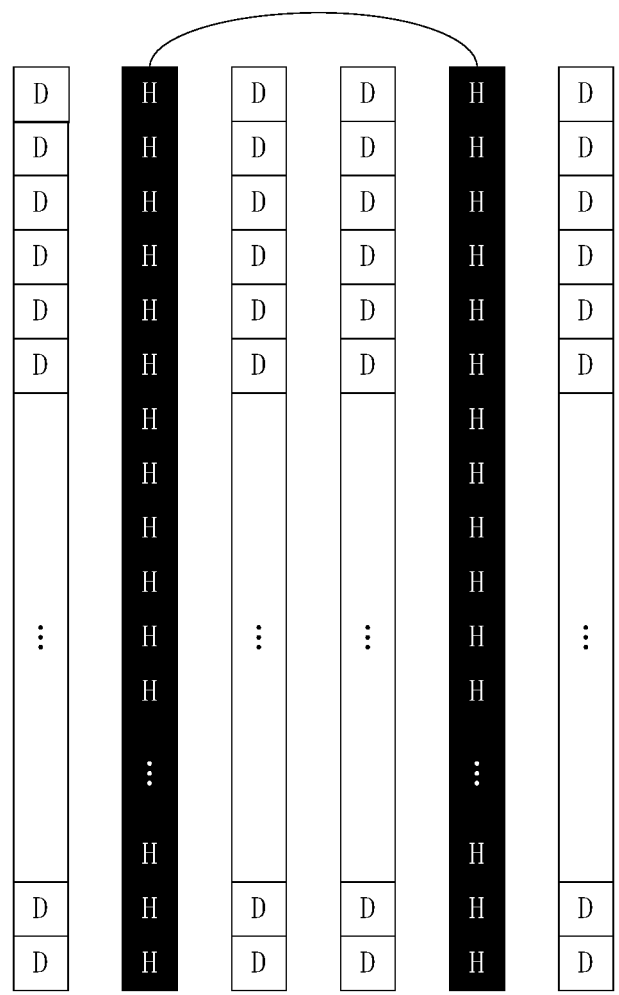
FIG. 4 illustrates a channel of all carrier channel estimation values of the present invention.
Figure 5:
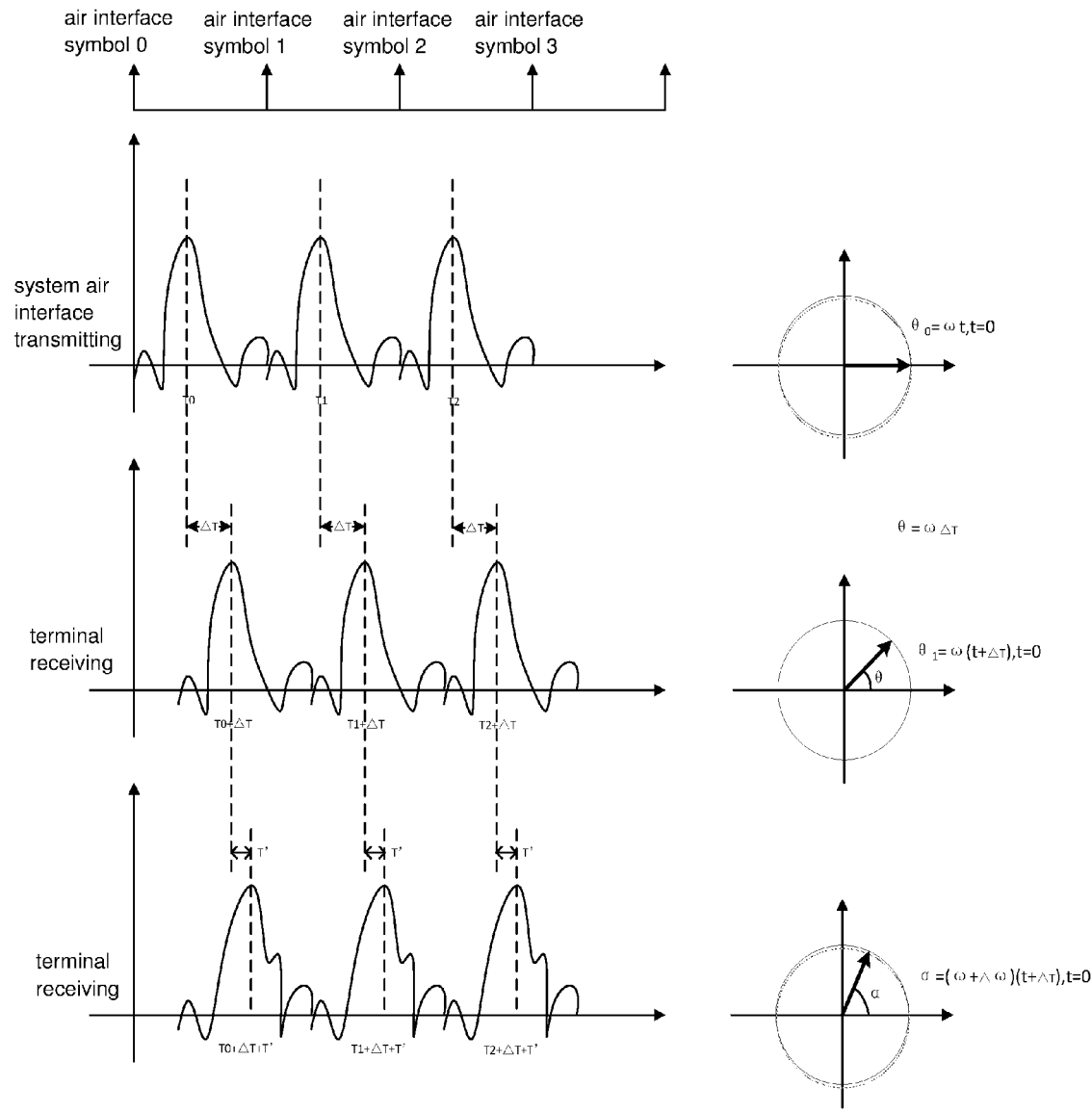
FIG. 5 illustrates angular velocity calculation and time delay compensation of the present invention.

Referring to FIG. 1 of the drawings, a flow chart of a method for measuring a time delay of an OFDM cluster system is illustrated. Accordingly, the method comprises steps of:

201) transforming a received signal to a frequency-domain, which comprises a pilot R (marked with R in a black frame) and DATA D (marked with D in a white frame), as shown in FIG. 2;

202) providing channel estimation to a corresponding carrier position based on RS, which specifically comprises steps of:

202-1) generating a local basic sequence $RS_L$ of the RS based on UE (terminal) ID;

202-2) extracting received sequence RSr from received frequency-domain data; and 202-3) processing the $RS_L$ and the RSr with conjugate dot product for obtaining the channel estimation H of each of carriers of the frequency-domain, wherein $H=RSr*RS_L^H$; wherein in FIG. 3, the pilot R is transformed into the channel estimation H (marked with H in a black frame) of a current one of the carriers;

203) providing frequency-domain interpolation channel estimation, wherein specifically, for a jumping pilot which is comb-shaped or tooth-shaped, calculating the H according to a pilot position, and providing linear interpolation for obtaining the H at all carrier points, as shown in FIG. 4;

repeating the steps 201-203 for the different symbols which all comprise the RS;

204) processing the carriers of the same frequency-domain between different symbols with frequency deviation estimation, so as to obtain an angular velocity, which specifically comprises steps of:

204-1) detecting whether pilot symbols of identical carriers at different time points (symbols) are identical, wherein if a phase difference exists between the identical carriers, a frequency deviation exists; and 204-2) obtaining the angular velocity according to the phase difference between the identical carriers;

wherein:

if a carrier phase at a time point t0 is $\omega 0$, then a received carrier is $Y0=e\textasciicircum{}j*2*PI*\omega 0$;

if the carrier phase at a time point t1 is $\omega 1$, then the received carrier is $Y1=e\textasciicircum{}j*2*PI*\omega 1$;

wherein the phase different between the t0 and the t1 is: $Y1*Y0\ H=e\textasciicircum{}j*2*PI*(\omega 1-\omega 0)$, then $\Delta\omega=\omega 1-\omega 0$;

and the angular velocity is $\phi=\Delta\omega/(t1-t0)$;

repeating the step 204 for different frequency-domain carrier symbols;

205) calculating an average angular velocity of the carriers of the frequency-domain;

206) after the linear interpolation, transforming RS symbols to a time-domain, so as to obtain a crude time delay; and 207) compensating based on the angular velocity, so as to obtain a fine time delay, as shown in FIG. 5.

Therefore, for the cluster system adopting the method, the accuracy of the terminal side system time delay detection is improved, in such a manner that the availability of the terminal side automatic time delay adjustment is greatly increased, and the TA adjustment under the group calling service of the cluster system, which is not timely, is sufficiently compensated.

The present invention combines frequency and time domain characteristics for time delay estimation. Compared with conventional time delay estimation, the present invention sufficiently improves time delay estimation accuracy. Based on the technology, the availability of the terminal side automatic time delay adjustment is increased. The terminal is able to automatically estimate an air interface time delay based on a downlink signal of the base station, in such a manner that the TA adjustment under the group calling service of the cluster system, which is not timely, is sufficiently compensated.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for measuring a time delay of an OFDM cluster system, comprising steps of:
   201) transforming a received signal to a frequency-domain;
   202) providing channel estimation to a corresponding carrier position based on RS, which specifically comprises steps of:
      202-1) generating a local basic sequence $RS_L$ of the RS based on UE (terminal) ID;
      202-2) extracting received sequence RSr from received frequency-domain data; and
      202-3) processing the $RS_L$ and the RSr with conjugate dot product for obtaining the channel estimation H of each of the carriers of the frequency-domain, wherein $H=RSr*RS_L^H$, wherein the superscript H refers to a conjugate operation;
   203) providing frequency-domain interpolation channel estimation, wherein specifically, providing linear interpolation for obtaining the H at all carrier points;
   204) processing the carriers of the same frequency-domain between different symbols with frequency deviation estimation, so as to obtain an angular velocity, which specifically comprises steps of:
      204-1) detecting whether pilot symbols of identical carriers at different time points (symbols) are identical, wherein if a phase difference exists between the identical carriers, a frequency deviation exists; and
      204-2) obtaining the angular velocity according to the phase difference between the identical carriers;
   205) calculating an average angular velocity of the carriers of the frequency-domain;
   206) after the linear interpolation, transforming RS symbols to a time-domain, so as to obtain a crude time delay; and
   207) compensating based on the angular velocity, so as to calculate a fine time delay.

2. The method, as recited in claim 1, further comprising a step of repeating the steps 201-203 for the different symbols which all comprise the RS.

3. The method, as recited in claim 1, wherein in the step 204, the angular velocity is calculated according to that:
   if a carrier phase at a time point $t_0$ is $\omega_0$, then a received carrier is $Y_0=e^{j*2*PI*\omega 0}$;
   if the carrier phase at a time point $t_1$ is $\omega_1$, then the received carrier is $Y_1=e^{j*2*PI*\omega 1}$;
   wherein the phase different between the $t_0$ and the $t_1$ is: $Y_1*Y_0^H=e^{j*2*PI*(\omega 1-\omega 0)}$, then $\Delta\omega=\omega_1-\omega_0$;
   and the angular velocity is $\phi=\Delta\omega/(t_1-t_0)$.

4. The method, as recited in claim 1, further comprising a step of repeating the step 204 for different frequency-domain carrier symbols.

5. The method, as recited in claim 1, wherein for a jumping pilot which is comb-shaped or tooth-shaped, the H is calculated according to a pilot position.

6. The method, as recited in claim 1, wherein the step 207 specifically comprises steps of:
   207-1) calculating the frequency deviation, wherein the frequency deviation $\Delta f$ is calculated based on the angular velocity $\phi$, wherein $\Delta f=\phi/2*PI$; and
   207-2) processing each of the carriers with frequency compensation in the time-domain, then $\gamma=Y*(e^{-j*2*PI*\Delta f*\Delta t})$.

* * * * *